No. 696,282. Patented Mar. 25, 1902.
F. B. UPTON.
PAINT DIPPING TANK.
(Application filed May 28, 1901.)
(No Model.)

WITNESSES
Edward W. Furrell
Mamie E. Mead

INVENTOR
Frank B. Upton,
by Carr & Carr,
attys.

THE NORRIS PETERS CO., PHOTO-LITHO., WASHINGTON, D. C.

UNITED STATES PATENT OFFICE.

FRANK B. UPTON, OF ST. LOUIS, MISSOURI, ASSIGNOR OF ONE-HALF TO EDWARD C. HANPETER, OF ST. LOUIS, MISSOURI.

PAINT-DIPPING TANK.

SPECIFICATION forming part of Letters Patent No. 696,282, dated March 25, 1902.

Application filed May 28, 1901. Serial No. 62,191. (No model.)

*To all whom it may concern:*

Be it known that I, FRANK B. UPTON, a citizen of the United States, and a resident of the city of St. Louis and State of Missouri, have invented a new and useful Paint-Dipping Tank, of which the following is a specification.

My invention relates to paint-dipping tanks, and has for its principal object to remove extraneous matter from the paint.

It consists in the parts and in the arrangement and combination of parts hereinafter described and claimed.

Figure 1:
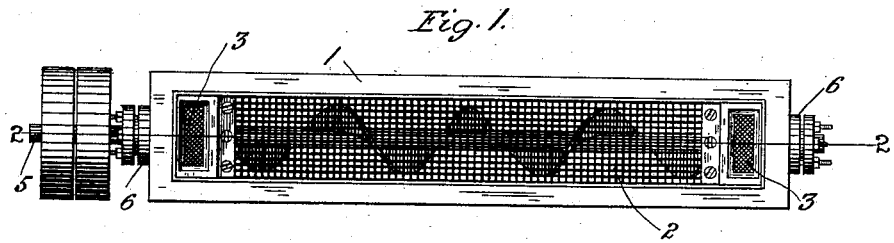
Figure 2:
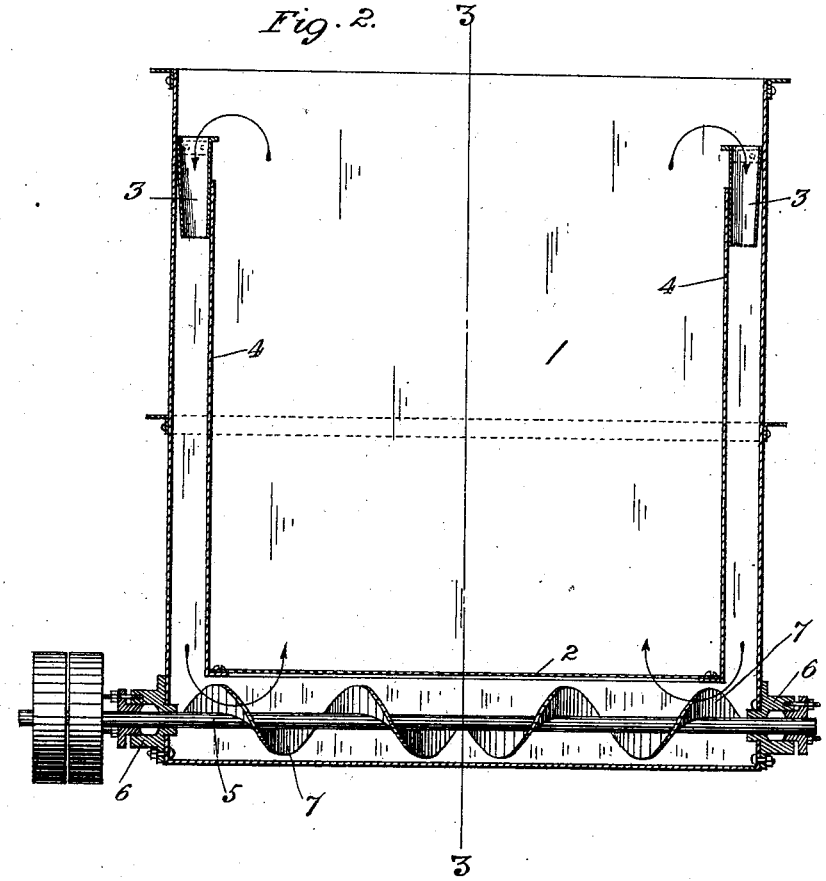
Figure 3:
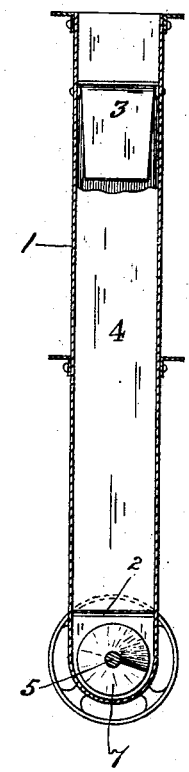

In the accompanying drawings, which form part of this specification, and wherein like symbols refer to like parts wherever they occur, Figure 1 is a plan view of my device. Fig. 2 is a longitudinal vertical section thereof on the line 2 2 of Fig. 1, and Fig. 3 is a cross-sectional view on the line 3 3 of Fig. 2.

My device consists of a tank or vessel 1, preferably of oblong shape and having considerable depth in proportion to its length. Said tank has an open-work or perforated false bottom 2 to prevent the articles dipped into said tank from coming in contact with the circulating mechanism hereinafter described, which is located beneath said open-work bottom. The middle portion of said tank is free from obstructions, so as to permit the full capacity of the tank to be utilized for dipping large articles. The perforations or meshes in said bottom are made so large as to offer only slight obstruction to the passage of the paint therethrough. A partition 4 extends from or near said false bottom to the upper part of said tank, at each end thereof, and forms, together with the ends of said tank, channels or end compartments for the downward flow of the paint in said tank. In the upper part of each of said end channels is a strainer 3. Said strainers are removably mounted and preferably vertically adjustable to accommodate the varying height of the paint. Said strainers 3 preferably have deep sides and have a fine screen in the bottom thereof to catch and hold the solid matter which may be unable to pass through said screen. A shaft 5 is mounted on bearings 6, provided therefor at each end of said tank beneath said open-work bottom. Each end of said shaft is provided with a helical vane 7. These two vanes have opposite windings and meet about midway of the tank. The bottom of said tank is preferably curved to prevent the accumulation of sediment.

The operation of my device is as follows: The tank is filled with paint, and the top of the strainer is adjusted to a position slightly below the level thereof. The shaft is set in motion with sufficient velocity to cause the paint to circulate. The direction of rotation is such as to cause the vanes to force the paint from the end compartments toward the middle of the tank, thence upwardly to the top thereof, thence over to the sides and into the strainers, passing therethrough downwardly through the end channels or end compartments to the bottom of the tank, where it is again operated upon by said vanes.

Obviously divers changes may be made in the construction of my device, and I do not wish to restrict myself to the details of construction hereinbefore set forth—as, for instance, the partition-walls may be omitted entirely.

What I claim is—

1. A paint-dipping tank comprising a tank, an open-work false bottom for said tank, a shaft located beneath said open-work bottom and provided with oppositely-turned helical vanes arranged to circulate the contents of said tank upwardly at the middle thereof, and a strainer above the false bottom and arranged to strain the paint in its downward current at the end of the tank, substantially as described.

2. A paint-dipping tank comprising a tank, an open-work false bottom for said tank, a shaft located beneath said open-work bottom and provided with oppositely-turned helical vanes arranged to circulate the contents of said tank upwardly at the middle thereof, and a strainer removably mounted above the false bottom and arranged to strain the paint in its downward current at the end of the tank, substantially as described.

3. A paint-dipping tank comprising a tank having partitions near its ends forming passage-ways opening into the bottom of said tank, strainers in said passage-ways and means at the bottom of said tank for circulating the contents of said tank upwardly through the middle of said tank and downwardly through said passage-ways, the middle portion of said tank being free from obstructions, substantially as described.

4. A tank having an open-work false bottom therein, a shaft mounted beneath said false bottom and provided with oppositely-turned helical vanes, a vertical partition near each end of said tank, and a strainer at each end of said tank, substantially as described.

5. A tank having an open-work false bottom, a shaft carrying oppositely-turned helical vanes at its respective ends, mounted between the true bottom of said tank and said false bottom, a vertical partition near each end of said tank, and a removable strainer at each end of said tank, substantially as described.

St. Louis, Missouri, May 25, 1901.

F. B. UPTON.

In presence of—
MAMIE E. MEAD,
WM. P. CARR.